(12) United States Patent　　　　(10) Patent No.:　US 12,609,556 B2
Park et al.　　　　　　　　　　　　(45) Date of Patent:　　Apr. 21, 2026

(54) MULTI-LAYERED TRIBOELECTRIC GENERATOR FOR ELECTROCEUTICAL

(71) Applicant: ENERGY MINING Co., Ltd., Suwon-si (KR)

(72) Inventors: Hyunmoon Park, Gunpo-si (KR); Joonha Hwang, Suwon-si (KR); Jangmook Jeong, Suwon-si (KR); Youngwook Chung, Suwon-si (KR)

(73) Assignee: ENERGY MINING Co., Ltd., Suwon-si (KR)

( * ) Notice: Subject to any disclaimer, the term of this patent is extended or adjusted under 35 U.S.C. 154(b) by 0 days.

(21) Appl. No.: 19/020,446

(22) Filed: Jan. 14, 2025

(65) Prior Publication Data

US 2026/0058496 A1　　Feb. 26, 2026

(30) Foreign Application Priority Data

Aug. 26, 2024　(KR) ........................ 10-2024-0114225

(51) Int. Cl.
　　*H02J 50/15*　　　(2016.01)
　　*H02J 50/00*　　　(2016.01)
　　*H02N 1/04*　　　(2006.01)
(52) U.S. Cl.
　　CPC ............ *H02J 50/15* (2016.02); *H02J 50/001* (2020.01); *H02J 50/005* (2020.01); *H02N 1/04* (2013.01); *H02J 2310/23* (2020.01)
(58) Field of Classification Search
　　CPC ........ H02J 50/15; H02J 50/001; H02J 50/005; H02J 2310/23; H02N 1/04
　　See application file for complete search history.

(56) References Cited

U.S. PATENT DOCUMENTS 8,552,498 B2　10/2013　Eguchi et al.
11,717,689 B2 *　8/2023　Maharbiz ............. A61N 1/3787
　　　　　　　　　　　　　　　　　　607/60

(Continued)

FOREIGN PATENT DOCUMENTS

JP　　2012-504927 A　　2/2012
JP　　　6748308 B2　　8/2020

(Continued)

OTHER PUBLICATIONS

Kao, Fu-Cheng et al., "Ultrasound-driven triboelectric and piezo-electric nanogenerators in biomedical application," Journal of Physics: Energy, vol. 6, issue 0222002, Apr. 11, 2024, pp. 1-22.

(Continued)

*Primary Examiner* — Rexford N Barnie
*Assistant Examiner* — Michael J Warmflash
(74) *Attorney, Agent, or Firm* — Studebaker Brackett PLLC

(57)　　　　　　　　ABSTRACT

The present disclosure may provide a triboelectric generator equipped in an electronic device, the triboelectric generator including a power generating unit configured to generate electricity based on an ultrasound wave provided from outside, a first silicon layer arranged between an upper surface of the power generating unit and an inner surface of the electronic device, a second silicon layer arranged on a lower surface of the power generating unit, and a housing arranged to surround an outer periphery of the power generating unit, the first silicon layer, and the second silicon layer.

9 Claims, 8 Drawing Sheets

(56) References Cited

U.S. PATENT DOCUMENTS

| | | | |
|---|---|---|---|
| 11,878,190 B2 * | 1/2024 | Kim | C08L 101/16 |
| 11,890,474 B2 * | 2/2024 | Carmena | A61N 1/37223 |
| 11,931,566 B1 * | 3/2024 | Park | A61N 1/0558 |
| 11,969,596 B2 * | 4/2024 | Carmena | A61N 1/0556 |
| 12,186,565 B1 * | 1/2025 | Park | A61N 1/378 |
| D1,095,858 S * | 9/2025 | Park | D24/200 |
| 2005/0060011 A1 | 3/2005 | Denker et al. | |
| 2006/0149337 A1 | 7/2006 | John | |
| 2009/0048643 A1 | 2/2009 | Erickson et al. | |
| 2012/0123508 A1 * | 5/2012 | Wentz | A61N 5/0601 |
| | | | 607/88 |
| 2016/0144166 A1 | 5/2016 | Decré et al. | |
| 2020/0139138 A1 | 5/2020 | Sit et al. | |
| 2020/0168788 A1 | 5/2020 | Wang et al. | |
| 2020/0297244 A1 * | 9/2020 | Brownhill | A61B 5/4836 |
| 2020/0305744 A1 | 10/2020 | Weerakoon et al. | |
| 2021/0138232 A1 * | 5/2021 | Paz | A61N 1/36031 |
| 2021/0308462 A1 * | 10/2021 | Carmena | A61N 1/0556 |
| 2023/0006573 A1 * | 1/2023 | Park | H02N 1/04 |
| 2023/0093932 A1 * | 3/2023 | Kim | A61N 1/3787 |
| | | | 310/310 |
| 2023/0115814 A1 * | 4/2023 | Thomas | H02J 50/10 |
| | | | 307/104 |
| 2023/0144358 A1 * | 5/2023 | Park | G16H 50/20 |
| | | | 600/547 |
| 2024/0215886 A1 | 7/2024 | Shin et al. | |
| 2024/0306956 A1 | 9/2024 | Duvall et al. | |
| 2025/0052832 A1 * | 2/2025 | Dong | H01M 10/48 |
| 2025/0065107 A1 * | 2/2025 | Park | A61N 1/0468 |
| 2025/0082481 A1 * | 3/2025 | Hwang | H02N 1/04 |
| 2025/0144432 A1 * | 5/2025 | Anderson | H04B 5/79 |

FOREIGN PATENT DOCUMENTS

| | | | |
|---|---|---|---|
| JP | 6877455 B2 | 5/2021 | |
| KR | 20-2012-0004590 U | 6/2012 | |
| KR | 10-2065204 B1 | 1/2020 | |
| KR | 10-2426119 B1 | 7/2022 | |
| KR | 10-2470806 B1 | 11/2022 | |
| KR | 10-2023-0044599 A | 4/2023 | |
| KR | 10-2550699 B1 | 7/2023 | |
| KR | 10-2551291 B1 | 7/2023 | |
| KR | 10-2023-0119760 A | 8/2023 | |
| KR | 10-2570253 B1 | 9/2023 | |
| KR | 10-2023-0144271 A | 10/2023 | |
| KR | 10-2023-0144358 A | 10/2023 | |
| KR | 10-2620483 B1 | 1/2024 | |
| KR | 10-2024-0022797 A | 2/2024 | |
| KR | 10-2024-0068132 A | 5/2024 | |

OTHER PUBLICATIONS

Chung, Youngwook et al., "Gigantic triboelectric power generation overcoming acoustic energy barrier using metal-liquid coupling," Joule, vol. 8, Sep. 18, 2024, pp. 1-16.

Notice of Allowance issued in KR 10-2024-0106543; mailed by the Korean Intellectual Property Office on Feb. 14, 2025.

Notice of Allowance issued in KR 10-2024-0106546; mailed by the Korean Intellectual Property Office on Feb. 14, 2025.

Notice of Allowance issued in KR 10-2024-0114225; mailed by the Korean Intellectual Property Office on Apr. 4, 2025.

Office Action issued in KR 10-2025-0052832; mailed by the Korean Intellectual Property Office on Jun. 9, 2025.

* cited by examiner

MULTI-LAYERED TRIBOELECTRIC GENERATOR FOR ELECTROCEUTICAL

CROSS-REFERENCE TO RELATED APPLICATION

The present application claims the benefit of Korean Patent Application No. 10-2024-0114225 filed in the Korean Intellectual Property Office on Aug. 26, 2024, the entire contents of which are incorporated herein by reference.

BACKGROUND

Field of the Disclosure

The present disclosure relates to a multi-layered triboelectric generator for an electroceutical, and more particularly, to a triboelectric generator having multiple layers and configured to increase usage time of an electroceutical and provide a stable power supply.

Background of the Related Art

With an increasing demand for maintaining a healthy life in aging societies, a demand for implantable medical devices has grown rapidly since 2010, especially in advanced countries. In particular, along with advancements in state-of-the-art IT technology, the implantable medical devices become smaller, exhibit high performance, and require low power. Owing to a size reduction to a few centimeters, the implantable medical devices are now referred to as electroceuticals. However, since operation of the implantable medical devices still relies on batteries to operate like in 1970s, these devices need to be replaced due to battery depletion.

Thus, to minimize side effects of surgeries due to replacement of implantable medical devices and economic and psychological burdens caused by the surgeries, technologies for recharging implantable devices have been researched and commercialized for over 30 years. However, a radio frequency (RF) method which is most commonly used is limitedly used due to limitations in a depth within a body, limitations in a charging amount, and safety issues. Since 2010, various charging methods such as an infrared (IR) method, radio frequency identification (RFID), a piezoelectric method, an optical method, and a thermoelectric method have been proposed, but have various limitations such as a low output, lack of durability, depth limitations, and an issue of harmlessness to the body. Thus, RF-based charging technologies have been still used mainly for medical purposes for over a decade.

In the 2020s, research into implantable electroceuticals that do not need batteries or battery replacement has become more diverse. Recently, research into electroceuticals that do not need batteries or battery replacement is being actively conducted.

Since 2020, various ultrasound-based charging technologies have been researched. However, ultrasound charging have several limitations in being applied to implantable devices due to reduced efficiency depending on a medium and heat generation caused by vibrational energy. Due to such limitations, actual application of the ultrasound-based charging technologies has been slow. Although infrared (IR)-based ultrasound charging is being discussed, charging efficiency is low at depths of 2 cm or greater, and experiments have not progressed beyond a mouse level. However, in a case of nerve stimulators that are not implanted deep into a body, several companies have launched commercial products using resonant inductive charging and inductive charging methods. In addition, wireless charging device companies are also releasing prototypes. However, most startups are still focusing on developing technologies that provide power closer to real-time usage rather than charging.

SUMMARY

Therefore, the present disclosure has been made to solve the above-described problems, and it is an object of the present disclosure to a triboelectric generator of an electroceutical that does not need a battery or battery replacement. The triboelectric generator may be powered through low-frequency ultrasound (LFU) or low-intensity pulsed ultrasound (LIPUS) band. In addition, the present disclosure is highly suitable for application to implantable electronic devices since a temperature change due to power generation is minimized. However, one or more embodiments are only examples, and the scope of the present disclosure is not limited thereto.

To accomplish the above object, according to one aspect of the present disclosure, a triboelectric generator equipped in an electronic device may be provided, the triboelectric generator including: a power generating unit configured to generate electricity based on an ultrasound wave provided from outside; a first silicon layer arranged between an upper surface of the power generating unit and an inner surface of the electronic device; second silicon layer arranged on a lower surface of the power generating unit; and a housing arranged to surround an outer periphery of the power generating unit, the first silicon layer, and the second silicon layer.

According to one example, the power generating unit may include: a ceramic substrate; and a plurality of units stacked on the ceramic substrate, the plurality of units including a first unit, a second unit, and a third unit. Each of the plurality of units may include: an inductive body configured to vibrate according to an ultrasound wave; a charged body configured to generate triboelectricity by friction with the inductive body; and a support configured to support the charged body.

According to one example, in each of the first unit and the second unit, the inductive body may contain barium titanate ($BaTiO_3$), the charged body may contain gold (Au), and the support contains at least one of barium titanate ($BaTiO_3$), zirconia ($ZrO_2$), and alumina ($Al_2O_3$). In the third unit, the inductive body may contain barium titanate, the charged body may contain gold (Au), and the support may contain a fluorine compound.

According to one example, the inductive bodies included in the first unit to the third unit, respectively, may be dome-shaped structures, and diameters of the inductive bodies included in the first unit to the third unit, respectively, may constitute an arithmetic sequence.

According to one example, the first silicon layer may have a hardness higher than a hardness of the second silicon layer, and the hardness of the first silicon layer may be set based on a transmittance with respect to a material constituting an inner surface of the electronic device, the inner surface in contact with the first silicon layer, and attenuation coefficients of the material and the first silicon layer with respect to the ultrasound wave.

According to one example, a Shore hardness of the first silicon layer may be 60 A or more, and a Shore hardness of the second silicon layer may be 50 A or less.

According to one example, the housing may be disposed to surround surfaces of the triboelectric generator other than an upper surface of the triboelectric generator to shield an electromagnetic interference between the triboelectric generator and outside.

According to one example, the housing may be made of mu-metal containing at least one among nickel, iron, copper, and molybdenum.

According to one example, the triboelectric generator may be attached to an inner surface of the electronic device, the inner surface being made of titanium.

According to one example, the diameter of the inductive body included in the first unit may be 20 mm, the diameter of the inductive body included in the second unit may be 18 mm, and the diameter of the inductive body included in the third unit may be 16 mm.

In addition to those described above, other aspects, features and effects will become apparent from the following drawings, claims, and detailed descriptions of the present disclosure.

In the present disclosure, energy may be generated by utilizing ultrasound waves in a medical band and the generated energy may be provided to an electroceutical to minimize battery replacement in the electroceutical. However, the scope of the present disclosure is not limited by the effects described above.

BRIEF DESCRIPTION OF THE DRAWINGS

The above and other objects, features and advantages of the present disclosure will be apparent from the following detailed description of the embodiments of the disclosure in conjunction with the accompanying drawings, in which.

DETAILED DESCRIPTION

Figure 1:
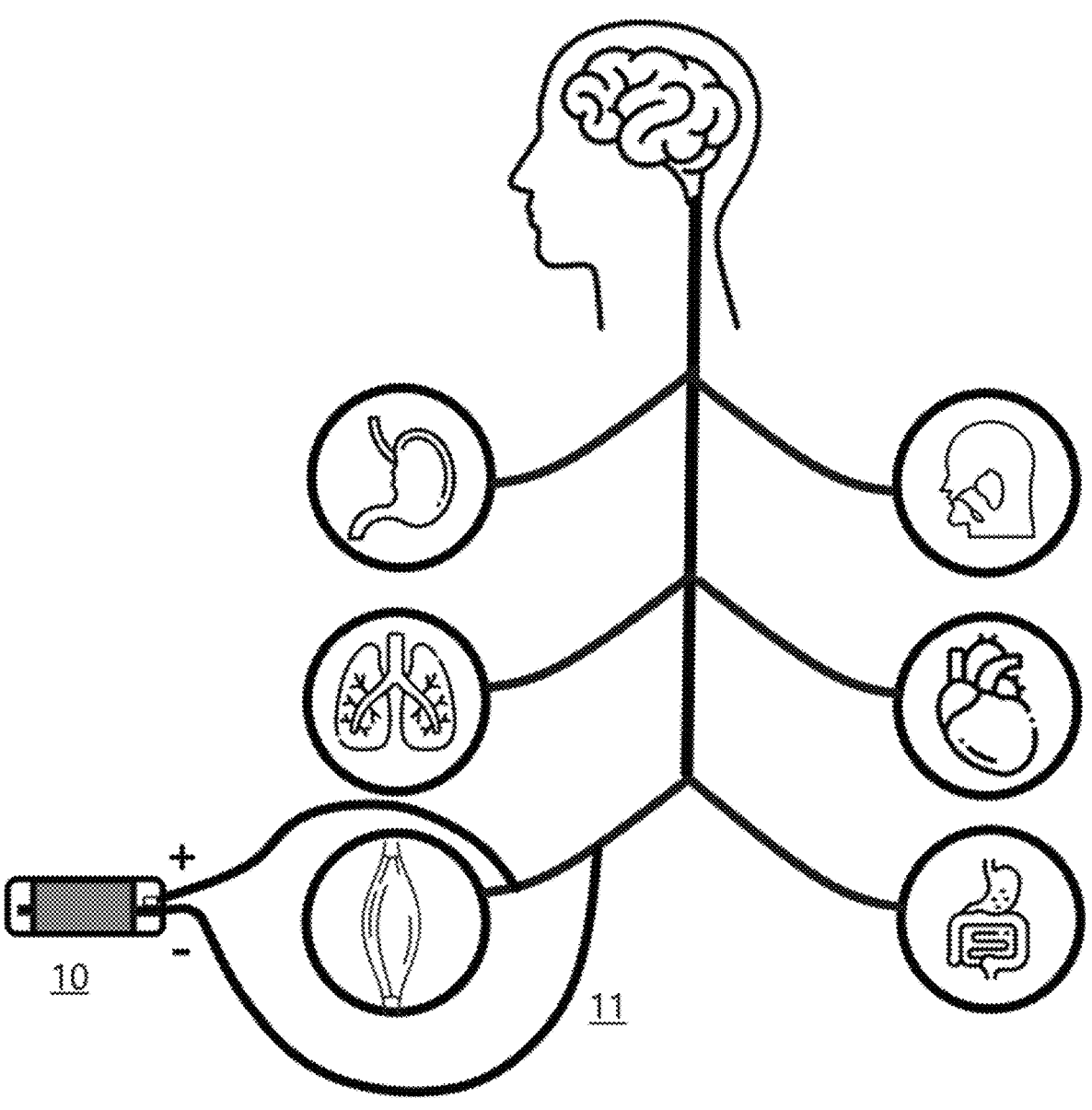
FIGS. 1 and 2 are diagrams for explaining an electroceutical.

Since the present disclosure may have various modifications and several embodiments, embodiments are shown in the drawings and will be provided in the detailed description in detail. Effects and features of the present disclosure and methods of accomplishing the same may be understood more readily with reference to the following detailed description of embodiments and the accompanying drawings. However, the present disclosure is not limited to the embodiments set forth herein, and may be embodied in many different forms.

It will be understood that although the terms "first," "second," etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "arranged on," another layer, region, or component, it can be directly or indirectly arranged on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a particular process order may be performed differently from the described order. For example, two consecutively described processes may be performed substantially at the same time or performed in an order opposite to the described order.

In the present specification, "A and/or B" refers to A or B, or A and B. In addition, "at least one of A and B" refers to A or B, or A and B.

It will be understood that when a layer, region, or component is referred to as being connected to or coupled to another layer, region, or component, it may be directly connected or coupled to the other layer, region, or component, and/or indirectly connected to the other layer, region, or component with intervening elements therebetween. For example, when a layer, region, or component is referred to as being electrically connected to or coupled to another layer, region, or component, it may be electrically directly connected or coupled to the other layer, region, or component, and/or electrically indirectly connected to the other layer, region, or component with intervening elements therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

As used herein, the term is intended to illustrate the embodiments but is not intended to limit the inventive concept. In this specification, the singular includes the plural unless specifically stated otherwise. It will be further understood that the terms "comprises," "comprising," "includes," and/or "including," when used herein, specify the presence of members, but do not preclude the presence or addition of one or more other members, unless otherwise specified.

A word "exemplary" used herein means "used as an example or illustration." Any embodiment described herein as "exemplary" is not necessarily to be construed as desirable or advantageous over other embodiments.

Embodiments of the present disclosure may be described in terms of functions or blocks that perform functions. Blocks which may be referred to as 'units' or 'modules' in the present disclosure may be physically implemented by analog or digital circuits such as logic gates, integrated circuits, microprocessors, microcontrollers, memories, passive electronic components, active electronic components, optical components, hardwired circuits, and the like, and may optionally be driven by firmware and software. Additionally, a term 'unit' means software or hardware elements such as field programmable gate array (FPGA) or application-particular integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes elements such as software elements, object-oriented software elements, class components, or task elements, processes, functions, attributes, procedures, subroutines, segments of a program code, drivers, firmware, micro-codes, circuits, data, database, data structures, tables, arrays, or variables. Functions provided in elements or "units" may be combined into a small number of elements or "units," or separated into additional elements or "units."

An embodiment of the present disclosure may be implemented using at least one software program running on at least one hardware device, and capable of performing network management functions to control elements.

Spatially relative terms such as "below," "beneath," "lower," "above," and "upper" may be used to easily describe a relationship of one component with other components as illustrated in the drawings. Spatially relative terms are to be understood as a term that includes other directions of the element in use or operation in addition to the direction illustrated in the drawings. For example, in a case in which a component shown in the drawing is described as being "below" or "beneath" another member, when the component is turned upside down, the component may be placed "above" the other member. Thus, the exemplary term "below" may include both downward and upward directions. Components may be oriented in other directions, and thus, the spatially relative terms may be interpreted according to the orientation.

Unless otherwise defined, all terms (including technical and scientific terms) used herein may be used as having a meaning that can be understood in common by one of ordinary skill in the art. In addition, terms defined in a generally used dictionary are not interpreted ideally or excessively, unless otherwise defined explicitly and particularly.

Hereinafter, embodiments of the present disclosure will be described in detail with reference to the attached drawings, in which like reference numerals designate like elements and repetitive explanation thereof will be omitted.

Figure 2:
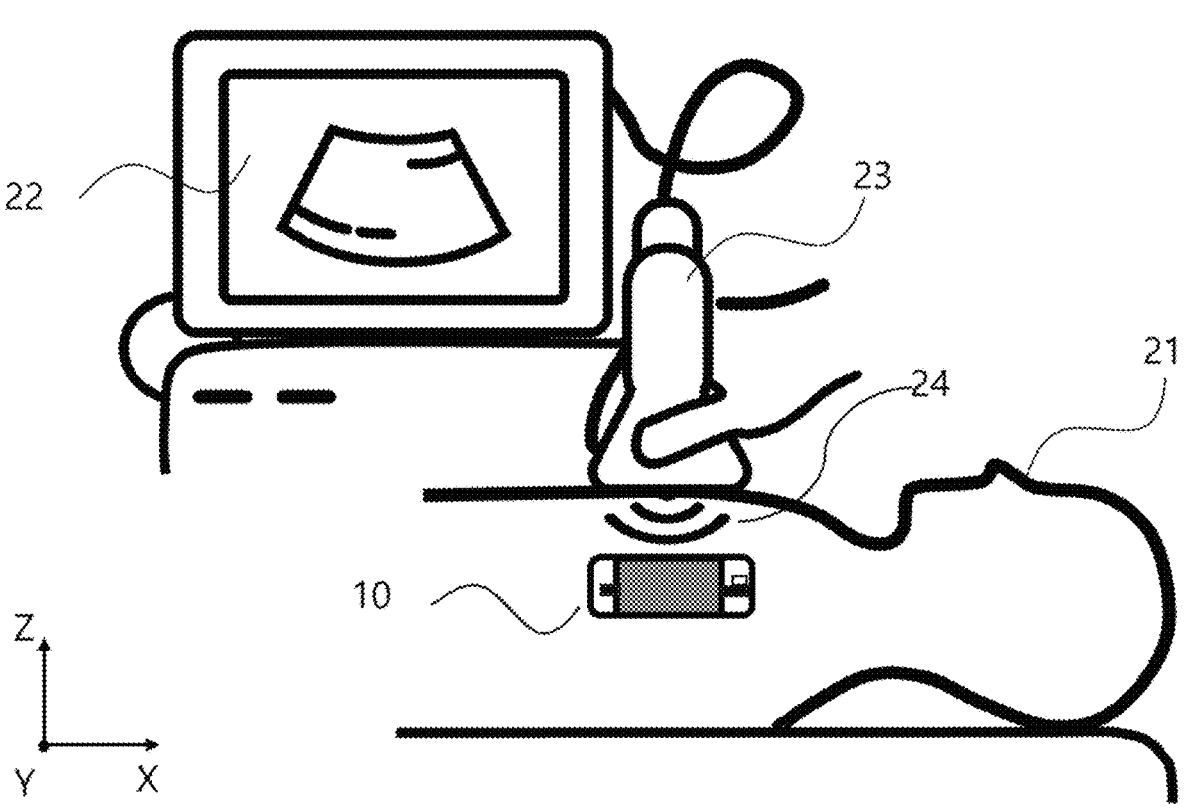

FIGS. 1 and 2 are diagrams for explaining an electroceutical.

Referring to FIG. 1, a position and operation of an electroceutical 10 are shown. The electroceutical 10 (e.g., an electronic device) may refer to a medical device implanted into a particular portion inside a body to stimulate a nerve (e.g., a vagus nerve 11) or sense biometric data. The electroceutical 10 is an implantable medical device and may be located at a depth of 2 cm or more inside the body. The electroceutical 10 is located deep in the body to be protected from an external impact or an environmental change.

The electroceutical 10 may be connected to main nerves such as the vagus nerve 11 and stimulate the main nerves through an electrical signal. The electroceutical 10 may control or improve a function of each organ through the electric signal. The electroceutical 10 may include a battery therein for long-term operation.

Referring to FIG. 2, a schematic diagram related to charging of the electroceutical 10 is shown. The electroceutical 10 is a medical device implanted into a body of a person 21, and thus, it may not be easy to replace a battery. Therefore, the electroceutical 10 inside the body may charge a battery based on an ultrasound wave provided from outside of the body.

First, an ultrasound monitoring device 22 may be utilized to identify a position of the electroceutical 10 implanted into the body of the person 21. When the position of the electroceutical 10 is identified through the ultrasound monitoring device 22, an ultrasound wave 24 may be provided into the body through an ultrasound probe 23 (e.g., a generating device). The ultrasound wave 24 may penetrate through the body and be introduced into the electroceutical 10. The ultrasound wave 24 introduced into the electroceutical 10 may vibrate a triboelectric generator 100 (e.g., a triboelectric generator 100 of FIG. 3) of the electroceutical 10. The vibration may generate electric charges within the triboelectric generator 100, and the electroceutical 10 may be charged through the generated electric charges.

The electroceutical 10 with an approximately rectangular shape may be located such that two widest surfaces (e.g., surfaces parallel to an XY plane) thereof are parallel with an elongation direction (e.g., an X-axis direction) of the person 21. Among the two widest surfaces, a surface located at a shallowest part of the body may be defined as a front surface, and a surface located at a deepest part may be defined as a rear surface. The ultrasound wave 24 may penetrate through the body to be introduced into the electroceutical 10 through the front surface of the electroceutical 10.

Figure 3:
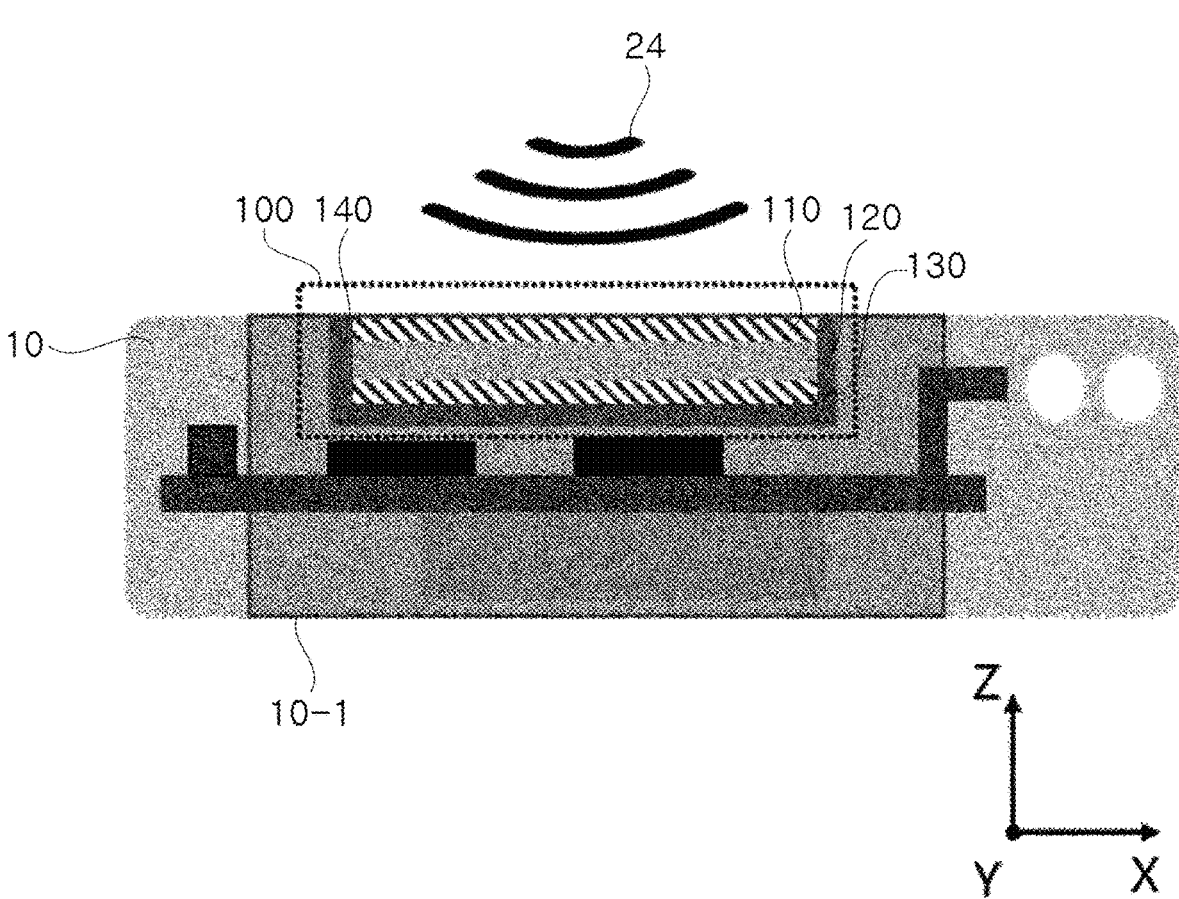
FIG. 3 is a right-side view of the electroceutical.

FIG. 3 is a right side view of the electroceutical

Referring to FIG. 3, the electroceutical 10 (e.g., an electronic device) may include the triboelectric generator 100 for charging. The triboelectric generator 100 may be located in a state of being attached to a front surface of the electroceutical 10 (e.g., a front surface inside the electroceutical 10) to effectively receive the ultrasound wave 24 provided from outside of the electroceutical 10.

The triboelectric generator 100 may include a first silicon layer 110, a power generating unit 120, a second silicon layer 130, and a housing 140. The triboelectric generator 100 may be designed to 1) maximize charging efficiency, and 2) minimize an impact of the triboelectric generator 100 on operation of the electroceutical 10 (e.g., sensing, stimulation, and communication).

The first silicon layer 110 may be disposed between an inner surface (e.g., a front surface) of the electroceutical 10 and an upper surface of the power generating unit 120. The first silicon layer 110 may minimize an air gap between an inner surface of the electroceutical 10 (e.g., an inner surface made of titanium) and the power generating unit 120. Since it is difficult for an ultrasound wave to penetrate through the air gap, the first silicon layer 110 may be provided to prevent the ultrasound wave from failing to reach the power generating unit 120 and being reflected on the air gap (approximately 99% reflected). The first silicon layer 110 may maximize charging efficiency of the electroceutical 10 by increasing transmission efficiency of the ultrasound wave.

The power generating unit 120 may generate electricity based on an ultrasound wave (e.g., an ultrasound wave having passed through a housing 10-1 of the electroceutical 10 and the first silicon layer 110) provided from outside (e.g., outside the electroceutical 10). The power generating unit 120 may generate triboelectricity as internal components vibrate due to the ultrasound wave. A configuration and operation of the power generating unit 120 will be described in detail with reference to FIGS. 4 and 5.

The second silicon layer 130 may be disposed on a lower surface of the power generating unit 120. The second silicon layer 130 may suppress physical vibrations generated from the power generating unit 120 in units of μm from being transmitted to outside of the triboelectric generator 100. The second silicon layer 130 may be provided to minimize an impact of the triboelectric generator 100 on operation (e.g., sensing, stimulation, and communication) of the electroceutical 10.

The housing 140 may be arranged to surround an outer periphery of the first silicon layer 110, the power generating unit 120, and the second silicon layer 130. The housing 140 may be also provided to minimize an impact of the triboelectric generator 100 on operation of the electroceutical 10 (e.g., sensing, stimulation, and communication). The housing 140 may be disposed to surround surfaces of the triboelectric generator 100 other than an upper surface thereof to shield electromagnetic interference between the triboelectric generator 100 and outside. The housing 140 may be made of mu-metal including nickel, iron, copper, and/or molybdenum to shield electromagnetic interference.

The mu-metal may effectively shield a magnetic field (e.g., 40 to 60 dB) in a low frequency band (e.g., a frequency band below 10 kHz) generated inside the triboelectric generator 100. The triboelectric generator 100 may also generate a magnetic field of several tens of mV while producing AC triboelectricity. The generated magnetic field may function as noise in other circuits.

Accordingly, the housing 140 may be provided to surround surfaces of the triboelectric generator 100 other than an upper surface thereof to receive ultrasound waves. The upper surface of the triboelectric generator 100 may be attached to an inner surface of the electroceutical 10 (e.g., an inner surface made of titanium) to package the triboelectric generator 100. As a result, an operation error of the electroceutical 10 that may be caused by the triboelectric generator 100 may be minimized.

In addition, the mu-metal may effectively shield a magnetic field (e.g., a magnetic field introduced into a human body during performing of magnetic resonance imaging (MRI)) introduced from outside the triboelectric generator 100. The mu-metal may also function to management of heat generated from the triboelectric generator 100, together with a ceramic substrate (e.g., a ceramic substrate 124 of FIG. 4) (e.g., see FIG. 5, etc.).

Hereinafter, setting of hardness of a silicon layer (e.g., the first silicon layer 110) is described.

The first silicon layer 110 may have a higher hardness than that of the second silicon layer 130. The hardness of the first silicon layer 110 may be set by taking into account an energy loss of an ultrasound wave. An energy loss of an ultrasound wave may be determined based on 1) a transmittance with respect to a material (e.g., titanium) constituting an inner surface of the electroceutical 10 in contact with the first silicon layer 110, and 2) an attenuation coefficient of the first silicon layer 110.

As described above, the first silicon layer 110 may function to maximize charging efficiency of the electroceutical 10 by increasing transmission efficiency of an ultrasound wave. The first silicon layer 110 is provided to have a thickness in mm units, and in a case of having a small thickness, a reflectivity (a reflection coefficient) may have a greater impact at a boundary surface between two media (e.g., titanium and silicon) than that of a transmittance (an attenuation coefficient). This is because, due to a difference in an acoustic impedance, a significant portion of an ultrasound wave is reflected before the ultrasound wave is transmitted into silicon. Although a transmittance is important, when an ultrasound wave is not transmitted sufficiently into the silicon due to reflection, an impact of the transmittance becomes relatively small. A reflectivity and a transmittance are interrelated to each other to have a sum of 1, and thus, will be explained together.

An ultrasound wave provided from outside may be transmitted to the triboelectric generator 100 under pressure Pa via silicon by passing through titanium (e.g., a material constituting a housing 10-1 of the electroceutical 10). When a difference in media between the titanium and the silicon is great, an energy loss is increased due to reflectivity, and the energy loss is associated with an acoustic impedance Z that varies depending on hardness of the silicon.

A material property of the silicon may be expressed by an attenuation coefficient $\alpha$, an acoustic impedance Z, a velocity $\zeta$, and a density $\rho$. Since the electroceutical 10 is implanted into the body, the silicon included in the electroceutical 10 may be based on medical silicon. A general material property of the medical silicon may include: an attenuation coefficient $\alpha = 1.6$ to $1.8$ dB/m, an acoustic impedance $Z = 1.15$ to $1.3 \cdot 10^6$ kg/m$^2$ s, a speed $\zeta = 1021$ m/s, and a density $\rho = 1243$ kg/m$^3$. Among these, the acoustic impedance may vary depending on hardness of the silicon, unlike water.

An acoustic impedance $Z_{Si\_40}$ of silicon with a Shore hardness of 40 A may be $1.15 \cdot 10^6$ kg/m$^2$ s, and an acoustic impedance $Z_{Ti}$ of the titanium may be $2.745 \cdot 10^6$ kg/m$^2$ s. A final transmittance $T_{40,eff}$ between the silicon with a Shore hardness of 40 A and titanium may be calculated using Equation 1 (assuming a basic energy loss of 5%).

$$R_{40} = \left( \frac{Z_{Ti} - Z_{Si\_40}}{Z_{Ti} + Z_{Si\_40}} \right)^2 \approx 0.857 \qquad \text{[Equation 1]}$$

$$T_{40} = 1 - R_{40} = 0.143$$

$$T_{40,eff} = T_{40} \times 0.95 \approx 0.136$$

In Equation 1, $R_{40}$ may be a reflectivity, $T_{40}$ may be a transmittance, and $T_{40,eff}$ may be a final transmittance. Then, an acoustic impedance $Z_{Si\_70}$ of silicon with a Shore hardness of 70 A may be $1.225 \cdot 10^6$ kg/m$^2$ s and a final transmittance $T_{70,eff}$ between the silicon with a Shore hardness of 70 A and titanium may be calculated using Equation 2 (assuming a basic energy loss of 5%).

$$R_{70} = \left( \frac{Z_{Ti} - Z_{Si\_70}}{Z_{Ti} + Z_{Si\_70}} \right)^2 \approx 0.849 \qquad \text{[Equation 2]}$$

$$T_{70} = 1 - R_{70} = 0.151$$

$$T_{70,eff} = T_{70} \times 0.95 \approx 0.143$$

In Equation 2, $R_{70}$ may be a reflectivity, $T_{70}$ may be a transmittance, and $T_{70,eff}$ may be a final transmittance. Then, an attenuation coefficient that contributes to an energy loss of an ultrasound wave is to be calculated.

The attenuation coefficient $\alpha$ may indicate a degree to which energy is absorbed or scattered when an ultrasound wave passes through silicon. Since the first silicon layer 110 has a small thickness to be measured in units of mm, an attenuation coefficient of the silicon layer may be assumed as 1.8 dB/m. When 1.8 dB/m is converted to units of neper (Np), the attenuation coefficient may be expressed as 0.207 Np/m. An amount L of attenuation and an energy loss ratio based on the attenuation coefficient may be calculated using Equation 3.

$$L = \alpha \times d = \frac{\frac{1.8}{8.686}\mathrm{Np}}{m} \times 0.005 \ m \approx 0.001035 \ \mathrm{Np} \qquad \text{[Equation 3]}$$

$$\text{Energy Loss Ratio} = ^{-L} = e^{-0.001035} \approx 0.998965$$

Final energy loss ratios $T_{40,eff\_final}$ and $T_{70,eff\_final}$ for silicon with a Shore hardness of 40 A and silicon with a Shore hardness of 70 A, respectively, may be calculated using Equation 4.

$$T_{40,eff\_final} = \qquad \text{[Equation 4]}$$

$$T_{40,eff} \times \text{Energy Loss Ratio} \approx 0.136 \times 0.998965 \approx 0.135$$

$$T_{70,eff\_final} = T_{40,eff} \times \text{Energy Loss Ratio} \approx 0.143 \times 0.998965 \approx 0.142$$

A final ultrasound transmission pressure $P_{40}$ for the silicon with a Shore hardness of 40 A, in consideration of the final energy loss ratio, is calculated using Equation 5 (where a speed of sound $c_{40}=1021$ m/s, a density $\rho_{40}=1243$ W/m³, and a loss due to a depth within a body is ignored).

$$I_{40} = I \times T_{40,eff\_final} = 6750 \ \mathrm{W/m^2} \qquad \text{[Equation 5]}$$

$$P_{40} = \sqrt{2 \cdot \rho_{40} \cdot c_{40} \cdot I_{40}} \approx 131,031 \ \mathrm{Pa} \approx 131,031 \ \mathrm{N/m^2} = 13.1031 \ \mathrm{N/cm^2}$$

Referring to Equation 5, a final ultrasound transmission pressure $P_{70}$ for the silicon with a Shore hardness of 70 A may be calculated as 13.4206 N/cm². Since the final ultrasound transmission pressure Pro for the silicon with a Shore hardness 70 A is greater than the final ultrasound transmission pressure $P_{40}$ for the silicon with a Shore hardness of 40 A, it may be appropriate for the first silicon layer 110 to include the silicon with a Shore hardness of 70 A.

When an air gap is present instead of the first silicon layer 110, an ultrasound pressure may not be transmitted to the power generating unit 120. When an impedance $Z_{Air}$ of air is assumed at 420.175 kg/m² s, a final ultrasound transmission pressure $P_{Air}$ of air is 63.06 Pa≈0.006306 N/cm². That is, when an air gap is present, an ultrasound pressure is hardly transmitted to the power generating unit 120 theoretically.

As such, since an ultrasound wave may not penetrate through an air gap, the first silicon layer 110 may be provided to prevent the ultrasound wave from failing to reach the power generating unit 120 and being reflected on the air gap (approximately 99% reflected). The first silicon layer 110 may maximize charging efficiency of the electroceutical 10 by increasing transmission efficiency of the ultrasound wave.

As described above, it may be appropriate to constitute the first silicon layer 110 to include silicon with a Shore hardness of 70 A rather than silicon with a Shore hardness of 40 A. Desirably, the first silicon layer 110 may include silicon with a Shore hardness of 60 A or greater. As a result, the triboelectric generator 100 with a size of 20 mm×20 mm or 20 mm×25 mm may provide power generation of approximately 20 to 30 mW/s to the electroceutical 10.

Figure 4:
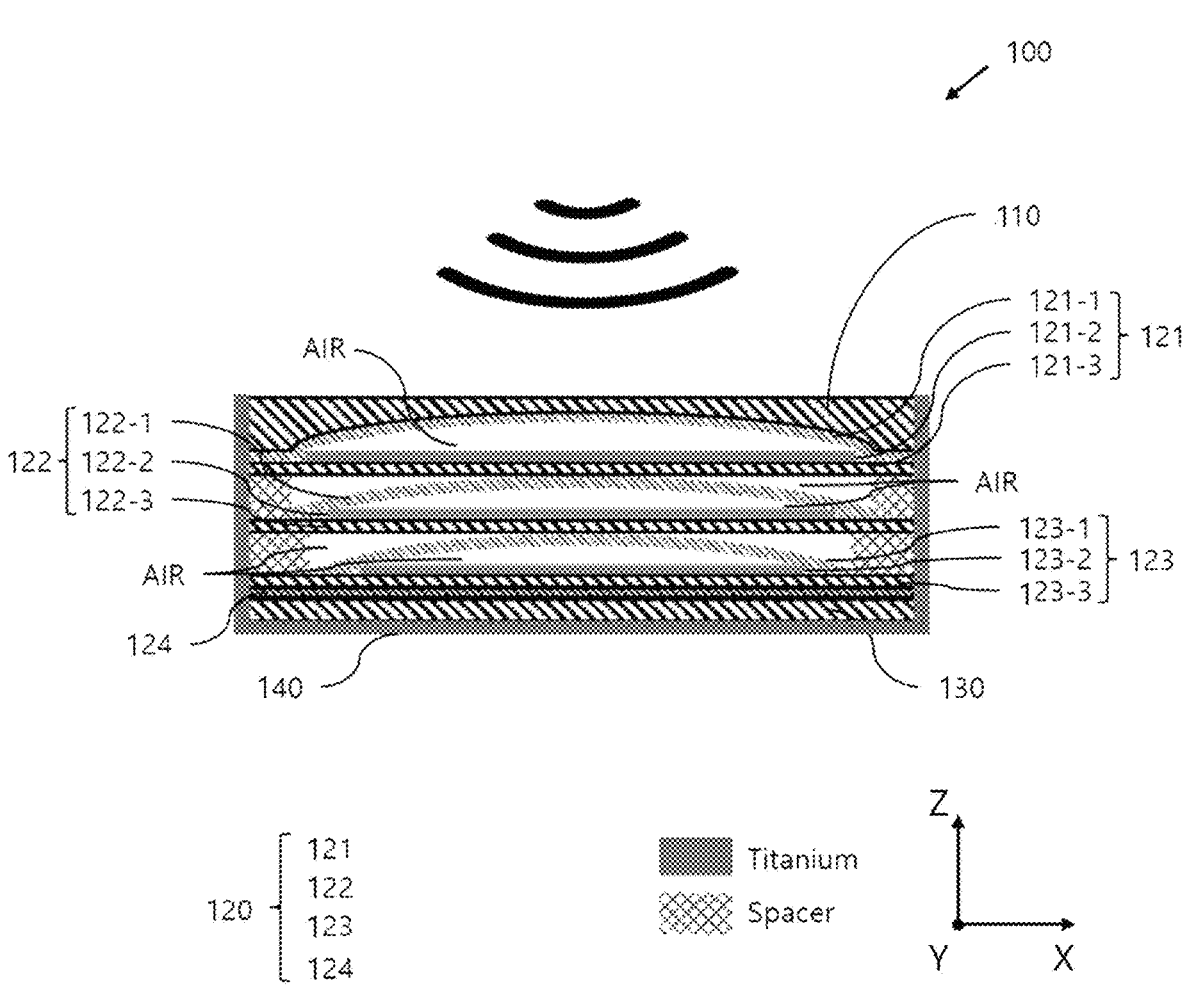
FIG. 4 is a right-side view of a triboelectric generator.

FIG. 4 is a right side view of a triboelectric generator.

Since triboelectric generators in the related art may generate triboelectricity through a medical ultrasound wave, and thus, have no restrictions in depth. However, there may be limitations in that an impedance Z of a device is high to be measured in units of megaohms (MΩs) and current is low to be measured in units of microamperes (uAs). Since a device with a high impedance has a high load, a method for reducing a load and lowering standby current is needed. When an impedance of a triboelectric generator is lowered from several kilohms (kΩ) to several ohms (Ω), energy efficiency for charging of an electroceutical and energy conversion and storage may be increased up to 90%, and usage time of the electroceutical may be increased based on the increased energy efficiency.

When a triboelectric generator with a high impedance is connected to an electroceutical with a low impedance, a voltage drop between 1/20 and 1/300 may occur. For example, when a triboelectric generator of 500 V to 0.1 mA is connected to an electroceutical, a phenomenon of a voltage drop of 5 V to 0.08 mA may occurs, and thus, an output may be reduced to approximately 1/125 (e.g., from 50 mW to 0.4 mW).

To minimize an output reduction due to a voltage drop, a method of increasing a frequency band of a provided ultrasound wave or reducing an impedance of a triboelectric generator may be suggested.

When a frequency band of a provided ultrasound wave is increased, a frequency band of an ultrasound wave may be increased, for example, to a high frequency band of 2 to 10 MHz. In this case, a transmittance of the ultrasound wave is decreased by approximately 65% to 90%, and a reflectivity thereof is increased by approximately 30% to 60%. Thus, an output of the triboelectric generator is decreased by approximately 80% to 95% compared to a proposed frequency band. In addition, since noise generated from the triboelectric generator is exponentially increased and energy generation efficiency is decreased, this may not be an appropriate method from a perspective of product implementation.

Therefore, it may be appropriate to reduce an impedance of a triboelectric generator to minimize an output reduction due to a voltage drop. When a pressure wave of an ultrasound wave reaches the triboelectric generator, the triboelectric generator may repeat friction due to a pressure. To increase power generation efficiency by triboelectricity, an output impedance needs to be improved. Referring to FIG. 4, configuring the triboelectric generator 100 to have multiple layers (e.g., configuration to have a parallelized device structure) may be a most appropriate method of reducing an impedance of the triboelectric generator 100.

When current increases, a resistance decreases according to Ohm's law (V=IR). When an ultrasound wave passes through a medium in the triboelectric generator 100 having multiple layers, a pressure change occurs, and the pressure change may be increased or decreased repeatedly according to a frequency. Such a periodic pressure change may effectively generate electric energy by generating an electrification effect inside the triboelectric generator 100 having multiple layers.

Referring to FIG. 4, a right side view of the triboelectric generator 100 according to an embodiment is shown. The triboelectric generator 100 may include the first silicon layer 110, the power generating unit 120, the second silicon layer 130, and the housing 140.

According to an embodiment, the power generating unit 120 may include a plurality of units 121 to 123 and a ceramic substrate 124. The plurality of units 121 to 123 may be stacked on the ceramic substrate 124.

Figure 5:
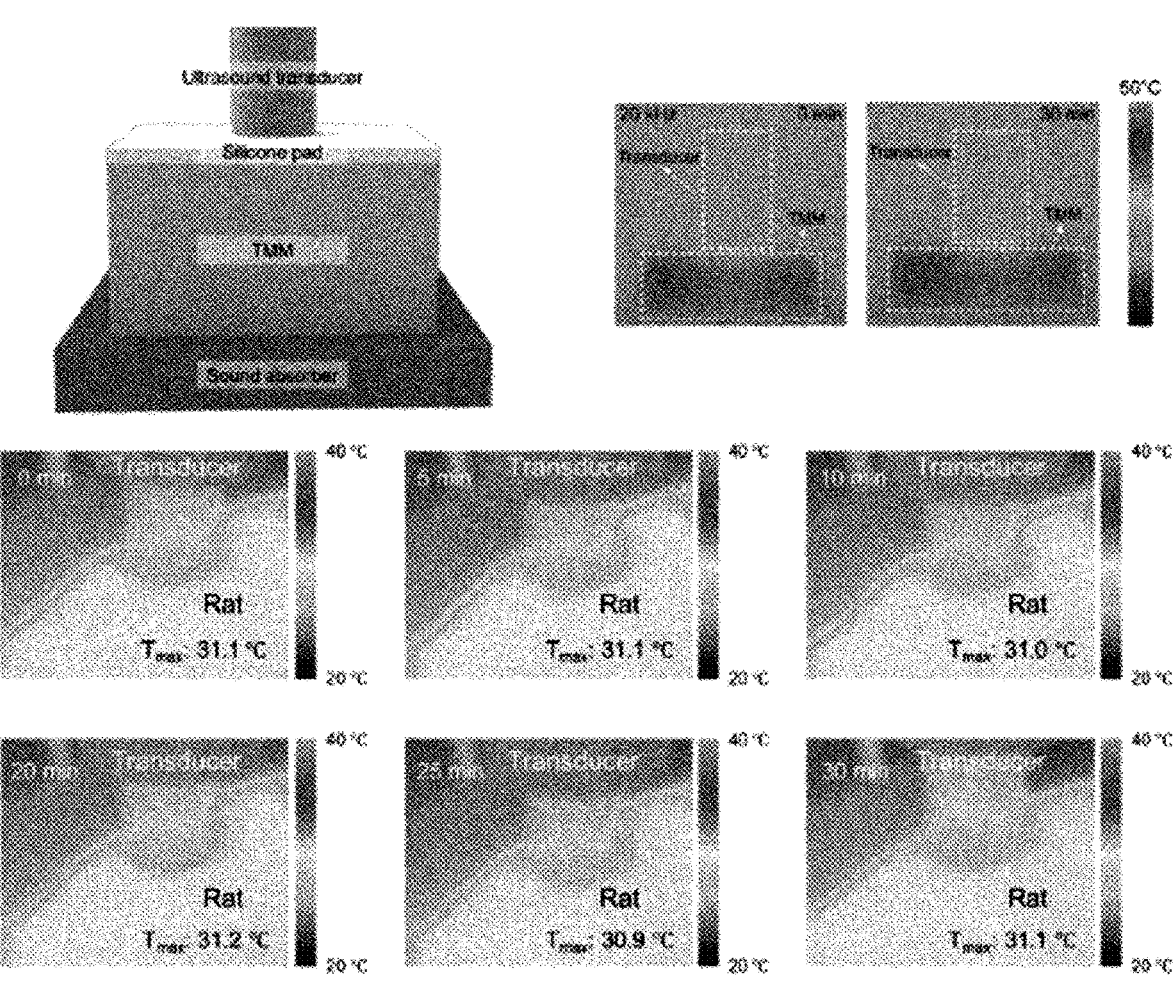
FIG. 5 is a diagram for explaining low heat generation performance of the triboelectric generator.

The ceramic substrate 124 has a thermal conductivity of 200 W/mK, i.e., which is 60 times higher than a thermal conductivity (e.g., 0.4 W/mK) of a general PCB substrate, showing excellent heat dissipation performance. A thermal expansion coefficient of the ceramic substrate 124 is 7 ppm/° C., which is lower than a thermal expansion coefficient (e.g., 14 ppm/° C.) of a general PCB substrate (e.g., a high Tg-PCB), and a high temperature resistance of the ceramic substrate 124 is 800° C., which is much higher than a high temperature resistance (e.g., 185 to 220° C.) of a general PCB substrate (e.g., a high Tg-PCB), and thus, may withstand an extremely high temperature. In addition, the ceramic substrate 124 has a higher dielectric constant and a mechanical strength than those of a general PCB substrate (e.g., a flame retardant (FR)-4 PCB of 140 Mpa). Referring to FIG. 5, heat generated by charging and power generation of an electronic device (an electroceutical) may have a temperature similar to a body temperature. The friction electric generator 100 generates very little heat, and is therefore harmless to a human body. According to the related art regarding a body region into which implantable devices are implanted, general implantable devices may increase a temperature of a body tissue by 2° C. or more. This violates safety limits, and a local temperature increase in a cell due to stress on or damage to the cell may affect cellular processes and cause malignancy or other complications. However, the triboelectric generator 100 may minimize temperature changes due to power generation, and thus, is appropriate to be applied to an implantable electronic device (e.g., an electroceutical).

The plurality of units 121 to 123 stacked on the ceramic substrate 124 may include a first unit 121, a second unit 122, and a third unit 123.

The supports 121-3, 122-3, and 123-3 may support a charged body. Spacers may be interposed between the supports 121-3, 122-3, and 123-3. Areas of respective units may be distinguished from each other by the spacers.

In the first unit 121 and the second unit 122, the supports 121-3 and 122-3 may include barium titanate, zirconia $(ZrO_2)$, and/or alumina $(Al_2O_3)$. Zirconia $(ZrO_2)$ and alumina $(Al_2O_3)$ may be materials with high reflectivity. Zirconia $(ZrO_2)$ and alumina $(Al_2O_3)$ may have a reflectivity 10 times higher than that of FR-4 including an epoxy resin and glass fiber.

For example, in the first unit 121, an ultrasound wave having penetrated through the inductive 121-1, the air layer AIR, and the charged body 121-2 may be reflected by the support 121-3 with high reflectivity. The reflected ultrasound wave may induce repetitive vibrations within the first unit 121. The repetitive vibrations may increase energy efficiency of the triboelectric generator 100.

In the third unit 123, the support 123-3 may include a fluorine compound (e.g., perfluoroalkoxy (PFA), fluorinated tetrafluoroethylene (FTFE), perfluorodecanoic acid (PFDA), or polydiacetylene (PDA)). The fluorine compound constituting the support 123-3 may have a higher reflectivity than that of the zirconia $(ZrO_2)$ and alumina $(Al_2O_3)$ constituting the supports 121-3 and 122-3, respectively. Referring to Table 1, a transmittance (transmittance=1–reflectivity) of each material is shown.

TABLE 1

| Transmittance | $Al^2O^3$ | BTO | $ZrO^2$ | FR-4 | PDA | PFA | PVDF | PFDA | PTFE |
|---|---|---|---|---|---|---|---|---|---|
| Alumina $(Al^2O^3)$ | 0.074 | 0.068 | 0.066 | 0.016 | 0.011 | 0.010 | 0.015 | 0.010 | 0.010 |
| BTO $(BaTiO^3)$ | 0.068 | 0.062 | 0.061 | 0.015 | 0.010 | 0.009 | 0.014 | 0.009 | 0.009 |
| Zirconia $(ZrO^2)$ | 0.066 | 0.061 | 0.060 | 0.015 | 0.009 | 0.009 | 0.013 | 0.009 | 0.009 |
| FR-4 | 0.016 | 0.015 | 0.015 | 0.004 | 0.002 | 0.002 | 0.004 | 0.002 | 0.002 |
| PDA(Polydopamine) | 0.011 | 0.010 | 0.009 | 0.002 | 0.001 | 0.001 | 0.002 | 0.001 | 0.001 |
| PFA (Perfluoroalkoxy) | 0.010 | 0.009 | 0.009 | 0.002 | 0.001 | 0.001 | 0.002 | 0.001 | 0.001 |
| PVDF (Polyvinylidene fluoride) | 0.015 | 0.014 | 0.013 | 0.004 | 0.002 | 0.002 | 0.004 | 0.002 | 0.002 |
| PFDA (Perfluorodecanoic acid) | 0.010 | 0.009 | 0.009 | 0.002 | 0.001 | 0.001 | 0.002 | 0.001 | 0.001 |
| PTFE (Polytetrafluoroethylene) | 0.010 | 0.009 | 0.009 | 0.002 | 0.001 | 0.001 | 0.002 | 0.001 | 0.001 |

The plurality of units 121 to 123 may include inductive bodies 121-1, 122-1, and 123-1 that vibrate according to an ultrasound wave, charged bodies 121-2, 122-2, and 123-2 that generate triboelectricity according to friction with an inductive body, and supports 121-3, 122-3, and 123-3 each supporting a charged body, respectively.

The inductive bodies 121-1, 122-1, and 123-1 may include barium titanate $(BaTiO_3)$. The inductive bodies 121-1, 122-1, and 123-1 may include thin films and vibrate. The inductive bodies 121-1, 122-1, and 123-1 may vibrate according to penetration of the ultrasound wave. The inductive bodies 121-1, 122-1, and 123-1 may vibrate within an air layer AIR, and the inductive bodies 121-1, 122-1, and 123-1 may be provided to have a thickness of 15 μm or less to efficiently vibrate.

The charged bodies 121-2, 122-2, and 123-2 may contain gold (Au). The charged bodies 121-2, 122-2, and 123-2 may generate triboelectricity due to friction with a vibrating inductive body. The charged bodies 121-2, 122-2, and 123-2 may contain not only gold (Au), but also a material in which triboelectricity (e.g., nickel, silver, etc.) may be easily generated.

The ultrasound wave having penetrated through the first unit 121, the second unit 122, the inductive body 123-1, the air layer, and the charged body 123-2 may be reflected by the support 123-3 with very high reflectivity. The reflected ultrasound wave may induce additional vibrations within the triboelectric generator 100. The additional vibrations may further increase energy efficiency of the triboelectric generator 100.

Referring to Table 1 and FIG. 4, the inductive body 121-1 of the first unit 121 is in contact with the first silicon layer 110, and thus, may include barium titanate $(BaTiO_3)$ having a highest transmittance for silicon. In addition, the supports 121-3 and 122-3 in the first unit 121 and the second unit 122 may include alumina $(Al_2O_3)$ and/or zirconia $(ZrO_2)$ having relatively high transmittance with respect to gold (Au), and the support 123-2 of the third unit 123 may include a fluorine compound (e.g., PFA, FTFE, PFDA, or PDA) having a relatively low transmittance with respect to gold (Au). A power generation amount of the triboelectric generator 100 due to multiple reflection may be improved by configuring a material of each structure in consideration of a transmittance and an amount of reflection of an ultrasound wave.

Figure 6:
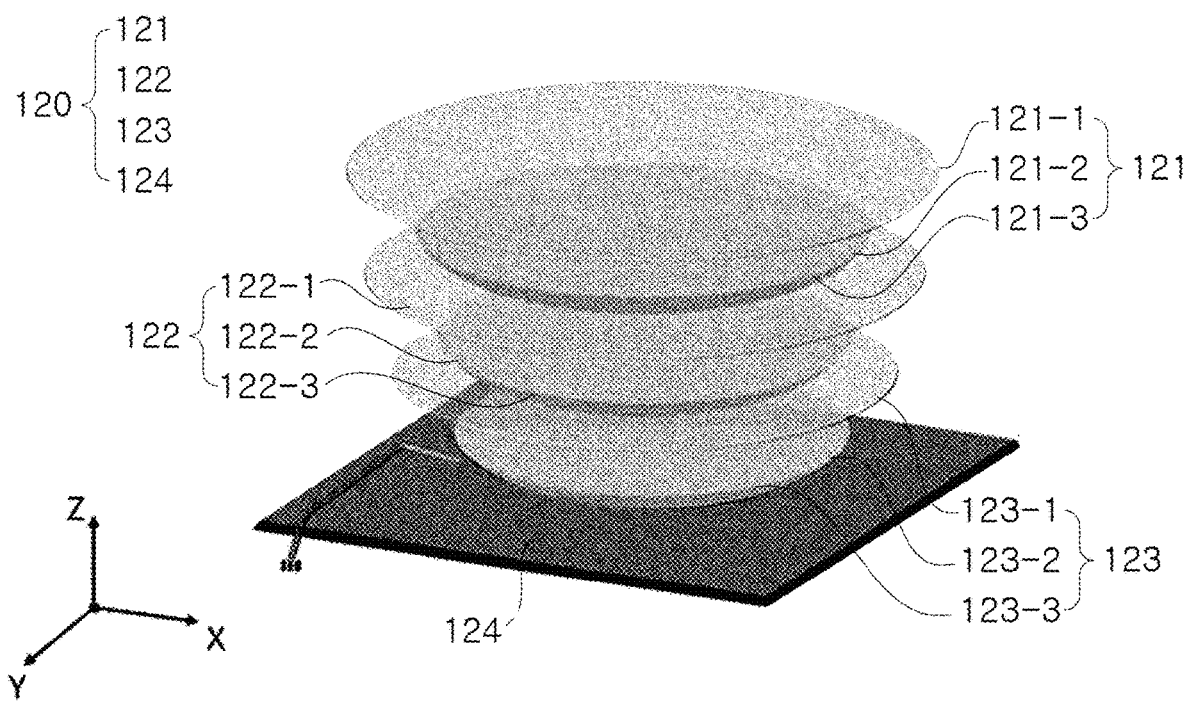
FIG. 6 is a perspective view of a power generating unit.
Figure 7:
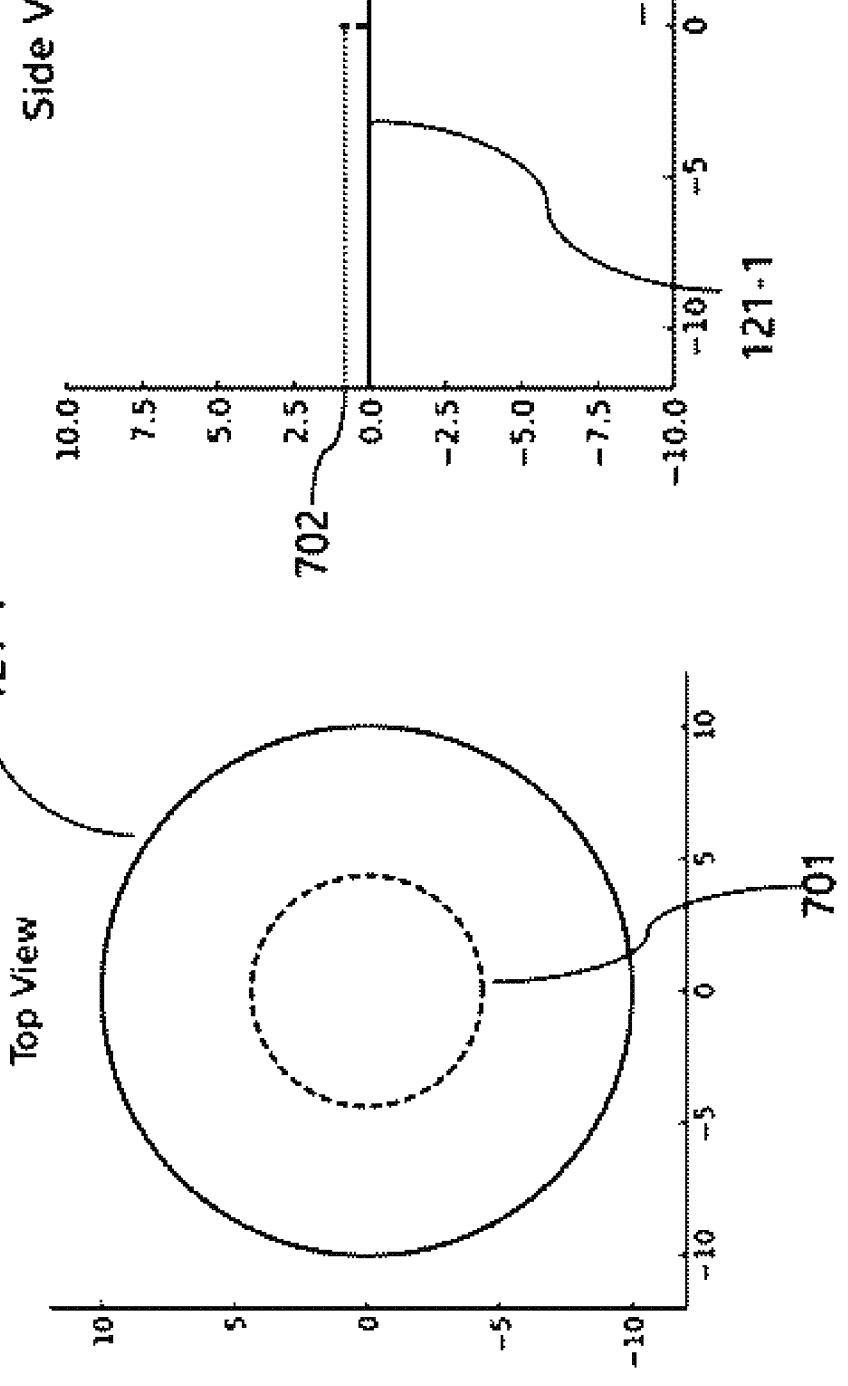
FIGS. 7 and 8 are diagrams for explaining a graph shape with respect to the power generating unit.
Figure 8:
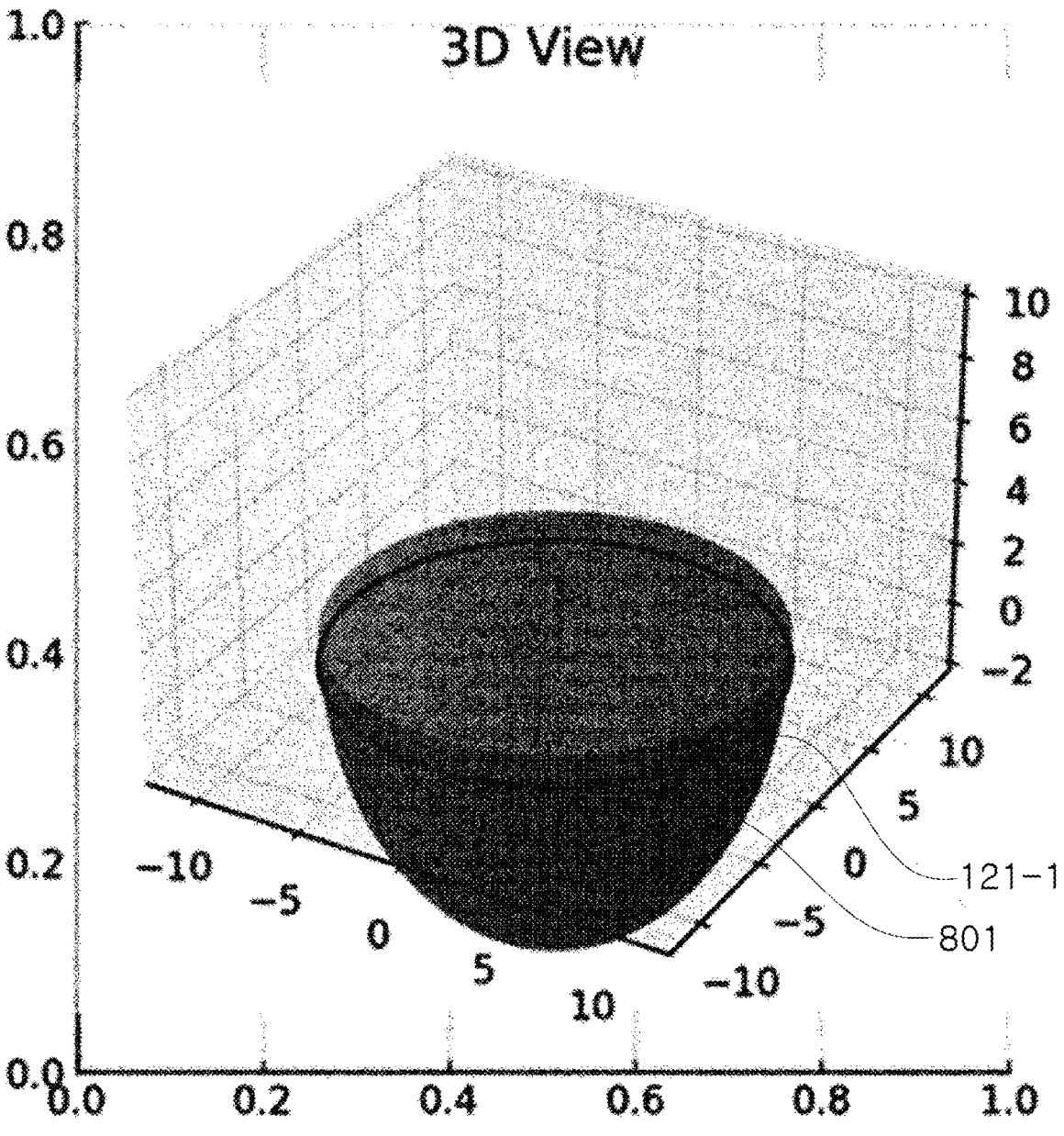

FIG. 6 is a perspective view of a power generating unit. FIGS. 7 and 8 are diagrams for explaining a graph shape with respect to the power generating unit.

Referring to FIG. 6, the inductive bodies 121-1 to 123-1 included in the power generating unit (e.g., inductive bodies of the first to third units 121 to 123) may be dome-shaped structures. The inductive bodies 121-1 to 123-1 may be provided as dome-shaped structures to focus an ultrasound wave.

For example, the inductive body 121-1 may be a dome-shaped structure with a diameter of 20 mm and a height of 1 mm. When an ultrasound wave penetrating through the inductive body 121-1 has a frequency of 20 kHz and input power of 2 W/cm², the ultrasound wave is focused according to a radius of a curvature of the inductive body 121-1.

Referring to FIG. 7, an ultrasound wave having penetrated through the inductive body 121-1 may be focused on a focusing area 701. A speed v of the ultrasound wave is assumed as 8430 m/s, a wavelength of the ultrasound wave is calculated to be approximately 421.5 mm according to λ=v/f. At this time, a focusing effect of the inductive body 121-1 may be calculated using Equation 6.

$$R = \frac{d^2 + 4h^2}{8h}$$ [Equation 6]

In Equation 6, R may be a curvature radius (R=10 mm) of the inductive body 121-1, and d may be a diameter (d=8.72 mm) of the focused area. At this time, when a depth 702 of the focusing area 701 is 1 mm, the ultrasound wave may have an effect of focusing 1.315 times energy as penetrating through the inductive body 121-1.

As described above, power $I_{input}$ of an ultrasound wave input to the inductive body 121-1 is 2 W/cm², and power of an ultrasound wave after penetration through the inductive body 121-1 in consideration of a difference in acoustic impedances between the inductive body 121-1 and the first silicon layer 110 is 1.764 W/cm². In consideration of the effect of focusing 1.315 times energy, the power of the ultrasound wave after the inductive body 121-1 may be calculated as 2.32 W/cm².

Referring to FIG. 8, an ultrasound wave defined by at least a part of a plurality of the first to third units 121 to 123 may be transmitted in a structure of an elliptical paraboloid 801. That is, each of inductive bodies of the first unit 121 to the third unit 123 may be a dome-shaped structure, and diameters of the inductive bodies of the first unit 121 to the third unit 123 may constitute an arithmetic progression (e.g., a tolerance of 2 mm). A diameter of the inductive body 121-1 of the first unit 121 may be 20 mm, a diameter of the inductive body 122-1 of the second unit 122 may be 18 mm, and a diameter of the inductive body 123-1 of the third unit 123 may be 16 mm.

While one or more embodiments of the present disclosure have been described with reference to the accompanying drawings. it will be understood by those of ordinary skill in the art that various changes in the form and details may be made therein without departing from the spirit and scope of the present disclosure as defined by the following claims.

The present disclosure is a submittal of research conducted under the title of "the Next-Generation Intelligent Semiconductor Technology Development R&D Program Development of MICS SoC and platform for invivo implantable electroceutical device (Project ID: 1415187321, Task Number: 20025736)" with a support of the Ministry of Trade, Industry and Energy (MOTIE) and Korea Planning&Evaluation Institute of Industrial Technology (KEIT).

The present disclosure is a submittal of research conducted under the title of "Development of a Miniaturized/ High-Power Energy Solution for Battery-Free electroceutical device (project ID 2420003291, task number 00445805)" with a support of the Ministry of SMEs and Startups (MSS) and the Korea Technology & Information Promotion Agency for SMEs (TIPA).

The present disclosure is a submittal of research conducted under the title of "ultrasound energy solution for remote controllable and battery replacement-free electroceutical device (DIPS 1000+) (20241755)" with a support of the Ministry of SMEs and Startups (MSS) and the Korea Institute of Startup and Entrepreneurship Development (KISED).

What is claimed is:

1. A triboelectric generator having multiple layers and equipped in an electronic device, the triboelectric generator comprising:

a power generating unit configured to generate electricity based on an ultrasound wave provided from outside;

a first silicon layer arranged between an upper surface of the power generating unit and an inner surface of the electronic device;

a second silicon layer arranged on a lower surface of the power generating unit; and a housing arranged to surround an outer periphery of the power generating unit, the first silicon layer, and the second silicon layer, wherein the first silicon layer has a hardness higher than a hardness of the second silicon layer, and the hardness of the first silicon layer is set based on a transmittance between materials constituting the first silicon layer and an inner surface of the electronic device and an attenuation coefficient of the first silicon layer.

2. The triboelectric generator of claim 1, wherein the power generating unit comprises:

a ceramic substrate; and a plurality of units stacked on the ceramic substrate, the plurality of units comprising a first unit, a second unit, and a third unit, wherein each of the plurality of units comprises:

an inductive body configured to vibrate according to an ultrasound wave;

a charged body configured to generate triboelectricity by friction with the inductive body; and a support configured to support the charged body.

3. The triboelectric generator of claim 2, wherein, in each of the first unit and the second unit, the inductive body contains barium titanate ($BaTiO_3$), the charged body contains gold (Au), and the support contains at least one of barium titanate ($BaTiO_3$), zirconia ($ZrO_2$), and alumina ($Al_2O_3$), and in the third unit, the inductive body contains barium titanate, the charged body contains gold (Au), and the support contains a fluorine compound.

4. The triboelectric generator of claim 3, wherein the inductive bodies comprised in the first unit to the third unit, respectively, are dome-shaped structures, and diameters of the inductive bodies comprised in the first unit to the third unit, respectively, constitute an arithmetic sequence.

5. The triboelectric generator of claim 1, wherein a Shore hardness of the first silicon layer is 60 A or more, and a Shore hardness of the second silicon layer is 50 A or less.

6. The triboelectric generator of claim 1, wherein the housing is disposed to surround surfaces of the triboelectric generator other than an upper surface of the triboelectric generator to shield an electromagnetic interference between the triboelectric generator and outside.

7. The triboelectric generator of claim 6, wherein the housing is made of mu-metal containing at least one among nickel, iron, copper, and molybdenum.

8. The triboelectric generator of claim 7, wherein the triboelectric generator is attached to an inner surface of the electronic device, the inner surface being made of titanium.

9. The triboelectric generator of claim 6, wherein the diameter of the inductive body comprised in the first unit is 20 mm, the diameter of the inductive body comprised in the second unit is 18 mm, and the diameter of the inductive body comprised in the third unit is 16 mm.

\* \* \* \* \*